(12) United States Patent
Goerlach-Doht et al.

(10) Patent No.: US 8,727,246 B2
(45) Date of Patent: May 20, 2014

(54) PROCESS FOR DRY-GRINDING A POLYSACCHARIDE DERIVATIVE

(75) Inventors: Yvonne M. Goerlach-Doht, Rosengarten (DE); Juergen Hermanns, Nottensdorf (DE)

(73) Assignee: Dow Global Technologies LLC, Midland, MI (US)

( * ) Notice: Subject to any disclaimer, the term of this patent is extended or adjusted under 35 U.S.C. 154(b) by 86 days.

(21) Appl. No.: 13/391,337

(22) PCT Filed: Aug. 31, 2010

(86) PCT No.: PCT/US2010/047199
§ 371 (c)(1),
(2), (4) Date: Feb. 20, 2012

(87) PCT Pub. No.: WO2011/046679
PCT Pub. Date: Apr. 21, 2011

(65) Prior Publication Data
US 2012/0187225 A1    Jul. 26, 2012

Related U.S. Application Data

(60) Provisional application No. 61/251,488, filed on Oct. 14, 2009.

(51) Int. Cl.
*B02C 11/08* (2006.01)
(52) U.S. Cl.
USPC .................................. 241/20; 241/18; 241/57
(58) Field of Classification Search
USPC ............................................... 241/18, 20, 57
See application file for complete search history.

(56) References Cited

U.S. PATENT DOCUMENTS

| | | | | |
|---|---|---|---|---|
| 4,044,198 A | * | 8/1977 | Kostrzewa et al. | 536/86 |
| 4,415,124 A | * | 11/1983 | Carduck et al. | 244/28 |
| 4,820,813 A | * | 4/1989 | Schulz | 536/84 |
| 4,979,681 A | * | 12/1990 | Donges et al. | 241/17 |
| 6,320,043 B1 | | 11/2001 | Weber et al. | |
| 6,509,461 B2 | | 1/2003 | Schlesiger et al. | |
| 7,259,257 B2 | | 8/2007 | Schlesiger et al. | |
| 2001/0034441 A1 | * | 10/2001 | Schlesiger et al. | 536/86 |

FOREIGN PATENT DOCUMENTS

| | | | |
|---|---|---|---|
| EP | 0201895 A2 | 11/1986 | |
| EP | 0824104 A2 | 2/1998 | |
| GB | 2262527 A * | 2/1992 | ............. C08B 11/20 |
| GB | 2262527 A | 6/1993 | |
| WO | 96/00748 | 1/1996 | |

OTHER PUBLICATIONS

W. Witt, et al., Direct Imaging of Very Fast Particles Opens the Application of the Powerful (Dry) Dispersion for Size and Shape Characterization, Sympatec GmbH, 2004.

* cited by examiner

*Primary Examiner* — Faye Francis
*Assistant Examiner* — Onekki Jolly

(57) ABSTRACT

In a process for producing a particulate polysaccharide derivative by dry-grinding a moist polysaccharide derivative the median length of the particles after dry-grinding is controlled by controlling the moisture content of the polysaccharide derivative prior to dry-grinding. Advantageously the median length of the particles after dry-grinding is adjusted to a first value by a first moisture content of the polysaccharide derivative prior to dry-grinding and is adjusted to a second value by a second moisture content.

18 Claims, No Drawings

PROCESS FOR DRY-GRINDING A POLYSACCHARIDE DERIVATIVE

CROSS REFERENCE TO RELATED APPLICATIONS

This application is a 35 USC §371 national phase filing of PCT/US2010/047199 filed Aug. 31, 2010, which claims the benefit of Application No. 61/251,488, filed Oct. 14, 2009.

This invention relates to a process for dry-grinding polysaccharide derivatives, particularly cellulose derivatives.

BACKGROUND OF THE INVENTION

Polysaccharide derivatives are typically produced as a reactor product in a form which is friable or lumpy or may resemble cotton wool. The reactor product is typically purified by washing. In this form, the wet polysaccharide derivatives still retain residual structures determined by the raw materials. Thus, for example, cellulose ethers can still exhibit the fibrous structure of the initial cellulose. These polysaccharide derivatives are generally unsuitable for use, for example, as products soluble in organic and/or aqueous media. In principle, virtually all polysaccharide derivatives have therefore to be ground and dried in order to be made suitable for use.

The cellulose derivatives rank among the industrially important polysaccharide derivatives. Their preparation, properties and applications are described, for example, in Ullmann's Encyclopedia of Industrial Chemistry, 5th Edition, (1986), Volume A5, pages 461-488, VCH Verlagsgesellschaft, Weinheim or in "Methoden der organischen Chemie" (methods of organic chemistry), 4th Edition (1987), Volume E20, Makromolekulare Stoffe, Part Volume 3, pages 2048-2076, Georg Thieme Verlag, Stuttgart.

EP-B 0 370 447 (equivalent to U.S. Pat. No. 4,979,681) describes a process for the non-destructive grinding and simultaneous drying of moist cellulose ethers, wherein a cellulose ether having an initial moisture content of 20 to 70 wt. % is conveyed by means of a transport gas and simultaneously comminuted by impact and friction and, by means of the energy of grinding, is dried to a residual moisture content of 1 to 10 wt. %.

WO 96/00748 discloses a process for comminuting cellulose ethers which involves the extrusion of a hydrated cellulose ether through orifices having a cross-sectional area of from 0.0075 mm$^2$ to 1 mm$^2$ (7.5×10$^{-9}$ m$^2$ to 1×10$^{-6}$ m$^2$) and cutting up the extrudate thus produced to the desired length.

These prior art processes are mostly multi-step with a predryer or preliminary embrittlement or preliminary compaction. Furthermore, in all processes the chemical and/or thermal action on the macromolecules, particularly during the processing of highly viscous, highly substituted products, is invariably so high that during the grinding process the macromolecules are broken down in the sense that their chains are reduced in length, which is manifested in particular by a more or less extensive breakdown of the viscosity compared with that of the products initially used. Moreover, the surfaces of the products treated by means of preliminary embrittlement or preliminary drying steps become keratinised.

EP-A 0 954 536 (equivalent to U.S. Pat. No. 6,320,043) discloses a process wherein a) a polysaccharide derivative is soaked or dissolved in an adequate quantity of a solvent like water, preferably 35 to 99 wt. %, particularly preferably 60 to 80 wt. %, based on the total weight, so that primary structures, such as fiber structures, which result from the polysaccharide starting material are largely removed, and subsequently b) the polysaccharide starting material is converted into the solid state in a dryer-pulveriser wherein the solvent contained in the soaked or dissolved polysaccharide derivative is converted into the vapour phase by means of a superheated vapour, and then c) optionally, in a subsequent drying step, is dried to the required moisture content in prior art units. The polysaccharide derivatives prepared by this process have a high bulk density and good flow properties. The particles thus produced have a shape factor of less than 5 and greater than/equal to 1, the majority (>50 wt. %) having a shape factor of less than/equal to 2 and the proportion of fine dust in the product being low. The shape factor means the ratio of the largest diameter to the smallest diameter of an (ideally ellipsoidal) body.

EP-A 1 127 895 (equivalent to U.S. Pat. No. 6,509,461) discloses a process for producing particulate water-soluble cellulose derivatives by a) forming a feed composition comprising 20 to 50 wt.% of a cellulose derivative and 50 to 80 wt.% of water, wherein the cellulose derivative is swollen or dissolved in the feed composition and b) contacting, in a high rotational speed impact mill, the feed composition with a heat exchange gas and carrier gas. EP-A 1 127 895 teaches that the bulk density of the particulate cellulose derivate product can be adjusted by the amount of the water present in the feed composition.

However, the water content of a moist cellulose derivative that is obtained after production and washing of the cellulose derivative is typically not constant. In a continuous process the water content is typically difficult to measure on-line, particularly if the water content is over 60 percent. Accordingly, adjusting the bulk density of a particulate cellulose derivate by measuring the water content in the feed composition for a dry-grinding device is inconvenient. Measurements of the water content by microwave or Near Infrared (NIR) are known for granular moist materials. However, these procedures are mainly useful for granular materials, but moist polysaccharide derivates of a high moisture content often have the shape of a paste or large lumps. Moreover, NIR measurements require extensive calibration.

One object of the present invention is to be able to control one or more critical dimensions of the polysaccharide derivative particles after dry-grinding. The optimum particle dimensions depend on the end-uses of the polysaccharide derivatives. Furthermore, a preferred object of the present invention is to be able to influence the bulk density of the polysaccharide particles after dry-grinding.

SUMMARY OF THE INVENTION

One aspect of the present invention is a process for producing a particulate polysaccharide derivative by dry-grinding a moist polysaccharide derivative wherein the median length of the particles after dry-grinding is controlled by controlling the moisture content of the polysaccharide derivative prior to dry-grinding.

Another aspect of the present invention is a process for producing a particulate polysaccharide derivative by dry-grinding a moist polysaccharide derivative wherein the moisture content of the moist polysaccharide derivative prior to dry-grinding is determined by measuring the median length of the particles after dry-grinding.

Surprisingly, it has been found that there is a correlation, typically a linear correlation, between the moisture content of the polysaccharide derivative prior to dry-grinding and the median length of polysaccharide derivative particles after dry-grinding. It has surprisingly been found that a higher moisture content of the polysaccharide derivative prior to dry-grinding leads to a lower median length of polysaccharide derivative particles after dry-grinding and vice versa. This finding does not only allow the production of polysaccharide derivatives with optimal particle length for a given application but also optimizes the energy required for the dry-grinding process. As disclosed in EP-A 0 954 536, primary structures, such as fiber structures in polysaccharide derivatives can be largely removed by soaking or dissolving polysaccharide derivatives in an adequate quantity of a solvent, preferably water. However, addition of a high amount of water requires a high amount of energy for subsequent evaporation of the water. The present invention allows determination of the minimal moisture content that is needed prior to dry-grinding to obtain polysaccharide derivative particles of a desired median length. Moreover, it has been found that measuring the median length of polysaccharide derivative particles after dry-grinding can be efficiently used for indirectly determining and if desired adapting the moisture content of the polysaccharide derivative prior to dry-grinding.

DETAILED DESCRIPTION OF THE INVENTION

The present invention relates to a process for producing a particulate polysaccharide derivative by dry-grinding a moist polysaccharide derivative. Dry-grinding is generally described in the art as drying and grinding simultaneously in one process step with one unit operation, typically an impact mill or an air swept impact mill. Drying is typically accomplished with a combination of hot gas and mechanical energy. Hot air is most commonly used but also hot nitrogen gas can be used. The hot gas and the wet product stream are generally fed via separate inlets into the mill, typically hot gas from the bottom and wet product at a side entrance via a feed screw system connected to the mill.

The polysaccharide derivatives, preferably the cellulose derivatives, used in this process are generally soluble or at least soakable in solvents, preferably water. Preferred polysaccharide derivatives are polysaccharide ethers and polysaccharide esters, more preferably cellulose ethers and esters, most preferably water-soluble cellulose ethers. They can have one or more substituents, preferably of the types: hydroxyethyl, hydroxypropyl, hydroxybutyl, methyl, ethyl, propyl, dihydroxypropyl, carboxymethyl, sulfoethyl, hydrophobic long-chain branched and unbranched alkyl groups, hydrophobic long-chain branched and unbranched alkyl aryl groups or aryl alkyl groups, cationic groups, acetate, propionate, butyrate, lactate, nitrate or sulfate, of which some groups, such as, for example, hydroxyethyl, hydroxypropyl, hydroxybutyl, dihydroxypropyl and lactate, are capable of forming grafts. The substituents of the polysaccharides according to the invention are not limited to these groups. Typical polysaccharide derivatives are guar derivatives, starch derivatives, chitin or chitosan derivatives, and preferably cellulose derivatives, but the polysaccharide derivatives according to the invention are not limited to these.

Examples of cellulose derivatives are hydroxyethyl cellulose (HEC), hydroxypropyl cellulose (HPC), ethyl hydroxyethyl cellulose (EHEC), carboxymethyl cellulose, carboxymethyl hydroxyethyl cellulose (CMHEC), hydroxypropyl hydroxyethyl cellulose (HPHEC), methyl cellulose (MC), methyl hydroxypropyl cellulose (MHPC), methyl hydroxyethyl cellulose (MHEC), carboxymethyl cellulose (CMC), hydroxypropyl methylcellulose acetate succinate (HPMC-AS), hydrophobically modified hydroxyethyl cellulose (hmHEC), hydrophobically modified hydroxypropyl cellulose (hmHPC), hydrophobically modified ethyl hydroxyethyl cellulose (hmEHEC), hydrophobically modified carboxymethyl hydroxyethyl cellulose (hmCMHEC), hydrophobically modified hydroxypropyl hydroxyethyl cellulose (hmHPHEC), hydrophobically modified methyl cellulose (hmMC), hydrophobically modified methyl hydroxypropyl cellulose (hmMHPC), hydrophobically modified methyl hydroxyethyl cellulose (hmMHEC), hydrophobically modified carboxymethyl methyl cellulose (hmCMMC), sulfoethyl cellulose (SEC), hydroxyethyl sulfoethyl cellulose (HESEC), hydroxypropyl sulfoethyl cellulose (HPSEC), methyl hydroxyethyl sulfoethylcellulose (MHESEC), methyl hydroxypropyl sulfoethyl cellulose (MHPSEC), hydroxyethyl hydroxypropyl sulfoethyl cellulose (HEHPSEC), carboxymethyl sulfoethyl cellulose (CMSEC), hydrophobically modified sulfoethyl cellulose (hmSEC), hydrophobically modified hydroxyethyl sulfoethyl cellulose (hmHESEC), hydrophobically modified hydroxypropyl sulfoethyl cellulose (hmHPSEC) or hydrophobically modified hydroxyethyl hydroxypropyl sulfoethyl cellulose (hmHEHPSEC). Particularly preferred cellulose derivatives are cellulose ethers having a thermal flocculation point in water, such as, for example, methyl cellulose, methyl hydroxyethyl cellulose, methyl hydroxypropyl cellulose and hydroxypropyl cellulose.

The production of polysaccharide derivatives, preferably polysaccharide ethers and polysaccharide esters is known in the art. Typically the production process involves activating the polysaccharide, such as cellulose, for example by treatment with an alkali metal hydroxide, reacting the thus treated polysaccharide with a derivatizing agent, such as an etherifying or esterifying agent, and washing the polysaccharide derivative to remove by-products. After the washing step the polysaccharide derivative generally has a moisture content of from 30 to 60 percent, typically from 45 to 55 percent, based on the total weight of the moist polysaccharide derivative. While the preferred washing liquor may depend on the specific type of polysaccharide derivative, preferred washing liquors generally are water, isopropanol, acetone, methylethylketone or brine. More preferred washing liquors generally are water or brine. Optionally the polysaccharide derivative is dried before adding a solvent to the polysaccharide derivative for moisture control, but this procedure is less preferred. Preferably a polysaccharide derivative obtained directly after production, washing and optionally cooling is used as a starting material for the present invention. Cellulose derivatives are generally washed at a temperature of from 20 to 120° C., preferably from 65 to 95° C. A solvent-moist, preferably a water-moist filter cake is obtained after washing and separating the polysaccharide derivative from the washing liquor. The moist polysaccharide derivative is usually obtained in the shape of moist granules, moist lumps and/or a moist paste.

According to one aspect of the present invention the polysaccharide derivative has been obtained by separating a polysaccharide derivative from a suspension thereof in a liquid, such as water, and is subsequently subjected to dry-grinding in a dry-grinding device. The suspension of particles in a liquid can originate from the production and washing the polysaccharide derivative, as described above. Separating a polysaccharide derivative from a suspension can be carried out in a known way, such as centrifugation.

According to another aspect of the present invention a dry polysaccharide derivative and a liquid, such as water, can be mixed in a compounder and the thus obtained moist polysaccharide derivative is subsequently subjected to dry-grinding in a dry-grinding device according to the process of the present invention. The compounder preferably allows thorough and intense mixing. Useful compounders are, for example, granulators, kneaders, extruders, presses, or roller mills, wherein the mixture of the polysaccharide derivative and liquid is homogenised by applying shear forces and compounding, such as a twin-screw compounder. Co-rotating as well as counter-rotating machines are suitable. So-called divided trough kneaders with two horizontally arranged agitator blades that engage deeply with one another and that perform a mutual stripping action, as in the case of twin-screw compounders are particularly suitable. Suitable single-shaft, continuous kneaders include the so-called Reflector® compounders, which are high performance mixers of modular construction, consisting of a multi-part, heatable and coolable mixing cylinder and a unilaterally mounted blade mixer (manufacturer: Lipp, Germany). Also suitable are so-called pinned cylinder extruders or Stiftconvert® extruders (manufacturer: Berstorff, Germany). The pins incorporated in the housing serve as abutments in order to prevent the kneaded material rotating together with the shaft. Kneader mixers with so-called double-blade sigma stirrers (manufacturer: Fima, Germany) in a horizontal assembly are particularly suitable. The blades operate at different speeds and their direction of rotation can be reversed. A stirred vessel with a vertically arranged mixer shaft is also suitable if suitable flow baffles are mounted on the vessel wall in order to prevent the kneaded mass rotating together with the stirrer shaft, and in this way an intensive mixing action is imparted to the kneaded material (manufacturer: Bayer AG). Also suitable are double-walled mixing vessels with a planetary stirrer and inline homogeniser.

Controlling the moisture content of the polysaccharide derivative prior to dry-grinding is essential. The moisture content is preferably 30 percent or more, more preferably 50 percent or more, and most preferably 55 percent or more prior to dry-grinding, based on the total weight of the moist polysaccharide derivative. The moisture content is preferably 98 percent or less, more preferably 80 percent or less, and most preferably 70 percent or less prior to dry-grinding, based on the total weight of the moist polysaccharide derivative. The optimum moisture content prior to dry-grinding is adapted to the desired median length of the particles after dry-grinding. The moisture content can be determined by ASTM method D-2363-79 (reapproved 1989), but preferably it is indirectly determined by measuring the median length of the particulate polysaccharide derivative after dry-grinding and determining the correlation between the median length of the particles after dry-grinding and the moisture content of the polysaccharide derivative prior to dry-grinding as described below.

According to a preferred embodiment of the present invention the median length of the particles after dry-grinding is a) controlled and b) varied or adjusted by a) controlling and b) varying or adjusting the moisture content of the polysaccharide derivative prior to dry-grinding.

According to another preferred embodiment of the present invention the median length of the particles after dry-grinding is adjusted to a first value by a first moisture content of the polysaccharide derivative prior to dry-grinding and is adjusted to a second value by a second moisture content.

In one aspect of the present invention the median length of the particles after dry-grinding is controlled by controlling the moisture content of the polysaccharide derivative prior to dry-grinding.

In another aspect of the present invention the moisture content of the moist polysaccharide derivative prior to dry-grinding is determined by measuring the median length of the particles after dry-grinding.

The preferred method of determining and/or controlling the moisture content of a given polysaccharide derivative prior to dry-grinding, particularly for determining and regulating the optimum moisture content for achieving the desired median length of a given polysaccharide derivative after dry-grinding comprises the steps of a) dry-grinding at least three samples, preferably at least 4 samples, more preferably at least 8 samples of a moist polysaccharide derivative, each sample having a different moisture content prior to dry-grinding, and measuring the median length of the particles after dry-grinding of each of the samples, b) determining the correlation between the median length of the particles after dry-grinding and the moisture content of the polysaccharide derivative prior to dry-grinding, and c1) adapting the moisture content of the polysaccharide derivative prior to dry-grinding to the desired median length of the particles after dry-grinding or c2) applying the correlation resulting from step b) to a moist polysaccharide derivative for determining the moisture content of the polysaccharide derivative prior to dry-grinding by measuring the median length of the particles after dry-grinding.

The determination or control of the moisture content of the polysaccharide derivative prior to dry-grinding is advantageously used for controlling the bulk density of the particles after dry-grinding.

Preferably the determined correlation between the median length of the particles after dry-grinding and the moisture content prior to dry-grinding is used as in-process control in a continuous dry-grinding process wherein the median length of dry-ground particles is determined and used for setting and optionally adapting the moisture content of the polysaccharide derivative prior to dry-grinding. Most preferably, the in-process control is carried out on-line.

Adapting the optimum moisture content for the polysaccharide derivative prior to dry-grinding to the desired median length of the particles after dry-grinding not only improves the control of the particle sizes after dry-grinding but also optimizes the energy required in the dry-grinding step. Uneconomical over-dosage of water which would need to be evaporated in the subsequent dry-grinding process or under-dosage of water which would result in products of undesirably performance can be avoided by the process of the present invention. Moreover, the median length of the particles can be controlled and optionally adjusted or varied without varying the parameters of the dry-grinding device or process, such as circumferential speed, air or gas flow through the mill (m3/h). When a change in median particle length is desired or when the median particle length does not meet the desired product specification and has to be adjusted, such change can be achieved without interrupting the dry-grinding process by controlling the moisture content of the polysaccharide derivative prior to dry-grinding. This makes the process of the present invention very efficient.

If desired in a specific process, wherein the dry-grinding is conducted in a rotational dry-grinding device, the median length of the particles after dry-grinding can be controlled and optionally varied or adjusted by controlling and optionally varying or adjusting the circumferential speed of the dry-grinding device, in addition to controlling the moisture content of the polysaccharide derivative prior to dry-grinding. The circumferential speed of the dry-grinding device is preferably controlled and optionally varied or adjusted in a range from 35 to 140 m/s, more preferably from 45 to 120 m/s, most preferably from 55 to 115 m/s.

After dry-grinding the polysaccharide derivative preferably has a median particle length of at least 50 micrometers, more preferably at least 60 micrometers, and most preferably at least 70 micrometers. The polysaccharide derivative preferably has a median particle length of up to 2000 micrometers, more preferably up to 600 micrometers, and most preferably up to 350 micrometers. The length of the particle is defined as the longest direct distance between opposite ends of the particle inside the particle contour, designated as LOP (Length of Particle). "Direct" means without loops or branches. The LOP is preferably measured by a high speed image analysis system which combines particle size and shape analysis. This specific image analysis method is described in: W. Witt, U. Köhler, J. List, Current Limits of Particle Size and Shape Analysis with High Speed Image Analysis, PARTEC 2007.

The LOP (50,3) is the median length and is defined as follows:

All particle size distributions, e.g. the LOP can be displayed and applied as number (0), length (1), area (2) or volume (3) distribution. Preferably the volume distribution of the LOP is calculated as cumulative distribution $Q_3$. The volume distribution within the particle length value LOP 50,3 is designated by the number 3 after the comma. The designation 50, reflecting the median value, stands for 50% of the length of particle distribution being smaller than the given value in μm and 50% being larger. The 50% LOP value is calculated by the image analyzer software. A high speed image analysis system is commercially available from Sympatec GmbH, Clausthal Zellerfeld, Germany as dynamic image analysis (DIA) system QICPIC™. The system analyses the shape of the particles and takes potential curliness of the particles into account. It provides a more accurate measurement of true particle sizes than other methods. The dynamic image analysis (DIA) system QICPIC™ is described in more detail by Witt, W., Köhler, U., List, J.: Direct Imaging of very fast Particles Opens the Application of Powerful (dry) Dispersion for Size and Shape Characterization, PARTEC 2004, Nuremberg, Germany.

After determination of the appropriate moisture content for a desired median length of the particles (LOP) after dry-grinding, the appropriate moisture content is compared with the actual moisture content of the polysaccharide derivative. Depending on the result, the polysaccharide derivative is left unchanged or contacted with a solvent to achieve the desired moisture content of the polysaccharide derivative. Typically the polysaccharide derivative is contacted with a solvent that dissolves, partially dissolves or soaks the polysaccharide derivative. The polysaccharide derivative is generally contacted with a solvent at a temperature of from 0 to 75° C., preferably from 8 to 75° C., more preferably from 8 to 60° C., most preferably from 15 to 40° C.

Suitable solvents for the soaking or dissolving are solvents whose molecules have polar groups which preferably contain the hetero atoms nitrogen, sulfur or oxygen. However, hydrocarbons and halogenated hydrocarbons may also be used. Preferred solvents are water, alcohols such as methanol, ethanol or isopropanol or esters such as ethyl acetate and butyl acetate. The particularly preferred solvent is water. The term "solvent" as used herein also includes mixtures of solvents.

Dry-grinding the moist polysaccharide derivative which is usually in the shape of moist granules, moist lumps and/or a moist paste can be conducted in a known dry-grinding device, for example in a gas-swept impact mill, preferably an air-swept impact mill, wherein the polysaccharide derivative is subjected to an impacting and/or shearing stress. Suitable mills are, for example, hammer mills, screen-type mills, pin mills, disk mills, jet mills, or preferably classifier mills. Superheated vapor of a solvent, such as superheated steam, or a steam/inert gas mixture or a steam/air mixture can be used as heat-transfer gas and transport gas, as described in more detail in European Patent Applications EP 0 954 536 A1 and EP 1 127 910 A1. In the dry-grinding process of the present invention the moisture content of the polysaccharide derivative after dry-grinding is typically reduced to 1 to 20 percent, preferably 1 to 10 percent, more preferably 1 to 5 percent, based on the total weight of the moist polysaccharide derivative.

The present invention is further illustrated by the following Examples which are not to be construed to limit the scope of the invention. Unless otherwise indicated, all parts and percentages are by weight.

Example 1

METHOCEL™ F75M cellulose ether having a degree of substitution of methoxyl groups of 27.0-30% and hydroxypropoxyl groups of 4.0-7.5% and a viscosity of 75,000 mPa·s, measured as a 2 percent aqueous solution at 20° C., was taken from a mechanical washing device as filter cake. METHOCEL™ F75M cellulose ether is commercially available from The Dow Chemical Company. Prior to sampling the filter cake from the washing device, the filter cake had been washed with hot water and then dewatered in a sieve-worm-centrifuge. The moist filter cake had a residual moisture content of 50%, corresponding to a water load of 1.0 kg water per kg of dry product and a temperature of 21° C. 120 kg/h of filter cake was fed into an air swept impact mill (Ultrarotor III, Altenburger Maschinen Jaeckering GmbH, Hamm, Germany) via a mill feed unit (Altenburger Maschinen Jaeckering GmbH, Hamm, Germany). The bottom blades of the vessel agitator pressed the filter cake into a single augur screw mounted at the bottom of the vessel. The wet product was forced through a perforated plate directly into the side of the impact mill between the first and second grinding stage. The mill was equipped with seven grinding stages and was operated with a circumferential speed of 105 m/s. The bottom three grinding stages were equipped with standard grinding bars. Turbo-bars were installed in the top four grinding stages. A co-rotating finger sifter wheel with twelve blades was installed on the top of the 7th grinding stage. The interior of mill jacket had the standard Altenburger corrugated stationary grinding plates.

A hot air stream, having a temperature of about 170° C. was fed at 4000 m³/h into the bottom air inlet of the mill. This allowed achieving a final product moisture level of below 5%. The ground and dried product was separated from the air. The over sized particles of the dried material were removed from the product with a rotating sieve having a mesh size of 160 μm. A free flowing product was produced having a median particle length LOP 50,3 of 267 μm, meaning that 50% of the lengths of the particles were smaller than 267 μm and 50% were larger than 267 μm. The length of the particles, called LOP, and the median particle length, calculated based on volume distribution, called LOP 50,3, were measured by an image analyzer (high speed image analyzer sensor QICPIC, Sympatec, Germany, with dry disperser RODOS/L with an inner diameter of 4 mm and dry feeder VIBRI/L and Software WINDOX5, Vers. 5.3.0 and M7 lens). The length of a particle (LOP) is defined as the longest direct distance between opposite ends of the particle inside the particle contour.

Examples 2-4

The same METHOCEL™ F75M cellulose ether as in Example 1 was taken from a mechanical washing device as filter cake. Prior to sampling the filter cake from the washing device, the filter cake had been washed with hot water and then dewatered in a sieve-worm-centrifuge as in Example 1. The moist filter cake was then transferred into a commercially available continuous jacketed plough share granulator with choppers. Water of a temperature of about 4° C. was sprayed into the granulator onto the filter cake. The moisture content was increased and the temperature was decreased to the levels shown in Table 1. The resulting wet granulate was then fed into the same air swept impact mill as used in Example 1. The hot air stream temperature was adjusted to dry the final product to a moisture level below 5% by weight. The over sized particles of the dried material were removed from the product as in Example 1. The median particle length LOP 50,3 was measured as in Example 1.

TABLE 1

| Example | Moisture prior to dry-grinding (%) | LOP 50,3 (μm) after dry-grinding | Product Temperature (° C.) |
|---|---|---|---|
| 1 | 50 | 267 | 21 |
| 2 | 60 | 180 | 12 |
| 3 | 62 | 196 | 15 |
| 4 | 72 | 116 | 11 |

Table 1 shows that the median particle length LOP 50,3 correlates to the moisture level according to the formula: LOP 50,3=599.94−6.7022*[moisture %], with an $R^2$ of 0.9694 and a negative slope to the moisture, i.e. when increasing the moisture level the particle length is reduced.

Examples 5-10

A commercially available continuous compounder was used to add water to dry METHOCEL™ K100M cellulose ether, commercially available from The Dow Chemical Company. The compounder jacket was supplied with a fluid of −8 to 13° C. METHOCEL™ K100M cellulose ether having a degree of substitution of methoxyl groups of 19-24% and of hydroxypropoxyl groups of 7-12%, a viscosity of 100,000 mPa·s, measured as a 2 percent aqueous solution at 20° C., and a moisture level of 4.6% was fed continuously at a feed rate of 30 kg/h into the compounder. Water of a temperature of about 25° C. was continuously added at rates between 36 and 118 kg/h to the compounder resulting in moisture levels between 55 and 81% and temperatures of 25° C., as shown in Table 2.

The wet product was transported continuously via a transport belt into a mill feed unit (Altenburger Maschinen Jaeckering GmbH, Hamm, Germany). The bottom blades of the vessel agitator pressed the paste into a single augur screw mounted at the bottom of the vessel. The wet product was forced through a perforated plate directly into the side of an Ultrarotor II "S" impact mill (Altenburger Maschinen Jaeckering GmbH, Hamm, Germany) between the first and second grinding stage. The mill was equipped with 7 grinding stages. The bottom 3 grinding stages were equipped with standard grinding bars. Turbo-bars were installed in the top 4 grinding stages. A co-rotating finger sifter wheel with 12 blades was installed on the top of the 7th grinding stage. The interior of mill jacket had the standard Altenburger corrugated stationary grinding plates.

The rotor of the impact mill was operated at a circumferential speed of 114 m/s. A hot gas stream, i.e. nitrogen was fed with 1000 m³/h into the bottom gas inlet of the mill. A cyclone was used to separate the dried product from the nitrogen. The final product moisture was smaller than 3% by weight. The median particle length, called LOP 50,3, was measured as in Examples 1-4.

The median particle length LOP 50,3 shows a correlation to the moisture level according to the formula: LOP 50,3=+732.05−7.3891*[% moisture], with an $R^2$ of 0.9792 and a negative slope, i.e. the LOP 50,3 decreases with increasing moisture.

Bulk density as used herein is defined as the ratio of apparent volume to mass of the material taken, called untapped bulk density, and also the ratio of tapped volume to mass of material taken, called tapped bulk density. An useful procedure for measuring these bulk densities is described in United States Pharmacopeia 24, Test 616 "Bulk Density and Tapped Density," United States Pharmacopeia Convention, Inc., Rockville, Md., 1999. The bulk densities of the produced cellulose ether particles were measured off-line.

TABLE 2

| Example | Moisture prior to dry-grinding (%) | Temperature prior to dry-grinding (° C.) | LOP 50,3 after dry-grinding (μm) | Untapped Bulk Density (g/l) | Tapped Bulk Density (g/l) |
|---|---|---|---|---|---|
| 5 | 55 | 26 | 321 | 115 | 188 |
| 6 | 59 | 25 | 297 | 178 | 286 |
| 7 | 64 | 25 | 272 | 222 | 337 |
| 8 | 70 | 25 | 209 | 287 | 401 |
| 9 | 76 | 25 | 158 | 324 | 460 |
| 10 | 81 | 25 | 144 | 397 | 532 |

The results in Table 2 illustrate the correlation between the moisture content of the particulate polysaccharide derivative prior to dry-grinding and the LOP 50,3 and the bulk density of the particulate polysaccharide derivative after dry-grinding. The measurement of the LOP 50,3 can be done on-line and is a rapid in-process control for indirectly determining the moisture content of the polysaccharide derivative prior to dry-grinding and the bulk density after dry-grinding. This allows adapting the moisture content to the desired median length and to the desired bulk density of the particles after dry-grinding.

The untapped bulk density shows a correlation to the LOP 50,3 according to the formula: Untapped bulk density=+569.09−1.351*[LOP 50,3], with an $R^2$ of 0.952 and a negative slope, i.e. the untapped bulk density decreases with increasing LOP 50,3.

The tapped bulk density shows a correlation to the LOP 50,3 according to the formula: Tapped bulk density=+746.07−1.623*[LOP 50,3], with an $R^2$ of 0.944 and a negative slope.

The untapped bulk density shows a correlation to the moisture content according to the formula: Untapped bulk density=10.286*[% moisture]−440.33 with an $R^2$ of 0.9898.

The tapped bulk density shows a correlation to the moisture content according to the formula: Tapped bulk density=12.369*[moisture %]−467.39 with an $R^2$ of 0.9829.

What is claimed is:
1. A process for producing a particulate polysaccharide derivative by dry-grinding a moist polysaccharide derivative wherein the median length of the particles after dry-grinding is controlled and adjusted by controlling and adjusting the moisture content of the polysaccharide derivative prior to dry-grinding in a gas-swept impact mill.
2. The process of claim 1 wherein the median length of the particles after dry-grinding is adjusted to a first value by a first moisture content of the polysaccharide derivative prior to dry-grinding and is adjusted to a second value by a second moisture content.

3. The process of claim 1 wherein the dry-grinding is conducted in a rotational dry-grinding device and the median length of the particles after dry-grinding is controlled by controlling the circumferential speed of the dry-grinding device, in addition to controlling the moisture content of the polysaccharide derivative prior to dry-grinding.

4. The process of claim 1 comprising the steps of
   a) dry-grinding at least three samples of a moist polysaccharide derivative, each sample having a different moisture content prior to dry-grinding, and measuring the median length of the particles after dry-grinding of each of the samples,
   b) determining the correlation between the median length of the particles after dry-grinding and the moisture content of the polysaccharide derivative prior to dry-grinding, and
   c1) adapting the moisture content of the polysaccharide derivative prior to dry-grinding to the desired median length of the particles after dry-grinding.

5. A process for producing a particulate polysaccharide derivative by dry-grinding a moist polysaccharide derivative in a gas-swept impact mill wherein the moisture content of the moist polysaccharide derivative prior to dry-grinding is determined by measuring the median length of the particles after dry-grinding.

6. The process of claim 5 comprising the steps of
   a) dry-grinding at least three samples of a moist polysaccharide derivative, each sample having a different moisture content prior to dry-grinding, and measuring the median length of the particles after dry-grinding of each of the samples, and
   b) determining the correlation between the median length of the particles after dry-grinding and the moisture content of the polysaccharide derivative prior to dry-grinding, and
   c2) applying the correlation resulting from step b) to a moist polysaccharide derivative for determining the moisture content of the polysaccharide derivative prior to dry-grinding by measuring the median length of the particles after dry-grinding.

7. The process of claim 5 wherein the determined correlation between the median length of the particles after dry-grinding and the moisture content prior to dry-grinding is used as in-process control in a continuous dry-grinding process wherein the median length of dry-ground particles is determined and used for setting and optionally adapting the moisture content of the polysaccharide derivative prior to dry-grinding.

8. The process of claim 7 wherein the in-process control is carried out on-line.

9. The process of claim 1 wherein the determination or control of the moisture content of the polysaccharide derivative prior to dry-grinding is used for controlling the bulk density of the particles after dry-grinding.

10. The process of claim 1 wherein the polysaccharide derivative has been obtained by separating a polysaccharide derivative from a suspension thereof in a liquid and is subsequently subjected to dry-grinding in a dry-grinding device.

11. The process of claim 1 wherein a dry polysaccharide derivative and a liquid are mixed in a compounder and the thus obtained moist polysaccharide derivative is subsequently subjected to dry-grinding in a dry-grinding device.

12. The process of claim 1 wherein the polysaccharide derivative has a moisture content of 30 to 98 percent prior to dry-grinding and the moisture content is reduced to 1 to 20 percent after dry-grinding, based on the total weight of the moist polysaccharide derivative.

13. The process of claim 1 wherein the median length of the particles is determined by high speed image analysis.

14. The process of claim 5 wherein the determination or control of the moisture content of the polysaccharide derivative prior to dry-grinding is used for controlling the bulk density of the particles after dry-grinding.

15. The process of claim 5 wherein the polysaccharide derivative has been obtained by separating a polysaccharide derivative from a suspension thereof in a liquid and is subsequently subjected to dry-grinding in a dry-grinding device.

16. The process of claim 5 wherein a dry polysaccharide derivative and a liquid are mixed in a compounder and the thus obtained moist polysaccharide derivative is subsequently subjected to dry-grinding in a dry-grinding device.

17. The process of claim 5 wherein the polysaccharide derivative has a moisture content of 30 to 98 percent prior to dry-grinding and the moisture content is reduced to 1 to 20 percent after dry-grinding, based on the total weight of the moist polysaccharide derivative.

18. The process of claim 5 wherein the median length of the particles is determined by high speed image.

* * * * *